US009132705B2

(12) United States Patent
Schultes

(10) Patent No.: US 9,132,705 B2
(45) Date of Patent: Sep. 15, 2015

(54) METHOD FOR THE MEASUREMENT AND ANALYSIS OF TYRE AIR PRESSURE WITH ALLOCATION OF WHEEL POSITIONS AND SYSTEM FOR TYRE AIR PRESSURE MEASUREMENT

(75) Inventor: Gerhard Schultes, Unterpremstätten (AT)

(73) Assignee: Maxim Integrated Products, Inc., San Jose, CA (US)

( * ) Notice: Subject to any disclaimer, the term of this patent is extended or adjusted under 35 U.S.C. 154(b) by 247 days.

(21) Appl. No.: 13/501,924

(22) PCT Filed: Oct. 11, 2010

(86) PCT No.: PCT/EP2010/065187
§ 371 (c)(1),
(2), (4) Date: Apr. 13, 2012

(87) PCT Pub. No.: WO2011/045268
PCT Pub. Date: Apr. 21, 2011

(65) Prior Publication Data
US 2012/0203400 A1    Aug. 9, 2012

(30) Foreign Application Priority Data

Oct. 14, 2009  (DE) .......................... 10 2009 045 712
Jan. 14, 2010  (DE) .......................... 10 2010 000 919

(51) Int. Cl.
B60C 23/04    (2006.01)

(52) U.S. Cl.
CPC ........... *B60C 23/0416* (2013.01); *B60C 23/045* (2013.01)

(58) Field of Classification Search
CPC .................... B60C 23/0416; B60C 23/045
USPC ............................................................ 701/1
See application file for complete search history.

(56) References Cited

U.S. PATENT DOCUMENTS

| | | | | |
|---|---|---|---|---|
| 8,400,289 | B2 * | 3/2013 | Heise et al. .................... | 340/447 |
| 2003/0058118 | A1 * | 3/2003 | Wilson ........................... | 340/679 |
| 2005/0081616 | A1 * | 4/2005 | Suzuki et al. .................. | 73/146 |

(Continued)

FOREIGN PATENT DOCUMENTS

CN    101052539 A    10/2007

OTHER PUBLICATIONS

Office Action dated Apr. 4, 2014, in related Chinese Patent Application No. 201080046709.5.

*Primary Examiner* — Fadey Jabr
*Assistant Examiner* — Yazan A Soofi
(74) *Attorney, Agent, or Firm* — North Weber & Bough LLP

(57) ABSTRACT

In a method for the measurement and analysis of tire air pressure with an allocation of wheel positions (I, II, III, IV) of a vehicle (1) for analysis in a tire air pressure measurement system each wheel (2) of the vehicle (1) is allocated an air pressure checking device (10), an LF receiver (11), in particular a magnetic field strength receiver, an analysis unit (13), an RF-transmission device (12) and an individual wheel code. The LF receiver (11) receives electrical LF signals from an LF transmission device (4) of a central unit (3) arranged in the vehicle (1), the analysis unit (13) analyzes the received signal amplitudes and from these determines a wheel rotation rate and the RF transmission device (12) of the wheel (2) sends RF signals with information about the wheel rotation rate and the individual wheel code to the central unit (3) of the vehicle (1). The central unit (3) determines the wheel position (I, II, III oder IV) of the wheel (2) using another measurement system (7) and allocates the air pressure checking device (10) and its individual wheel code to the known wheel position (I, II, III or IV) on the vehicle (1). A tire air pressure measurement system has a central unit (3) arranged in a vehicle (1) with an LF transmission device (4), an RF receiver device (5) and a central analysis device (6). An air pressure checking device (10) arranged on each wheel (2) of the vehicle (1), an LF receiver device (11), RF transmission device (12) and analysis unit (13) for determining a rotation rate using a periodically varying amplitude of the received LF signal, and a measurement system (7) for measuring the wheel rotation rate at each wheel (2) and/or for determining the type of bend are additionally provided.

13 Claims, 2 Drawing Sheets

(56) References Cited

U.S. PATENT DOCUMENTS

| | | | |
|---|---|---|---|
| 2007/0198228 A1* | 8/2007 | Pretzlaff et al. | 702/189 |
| 2007/0208841 A1* | 9/2007 | Barone et al. | 709/223 |
| 2008/0143503 A1* | 6/2008 | Watabe et al. | 340/438 |
| 2008/0178667 A1* | 7/2008 | Kusunoki | 73/146.4 |
| 2008/0211650 A1* | 9/2008 | Nakatani et al. | 340/447 |
| 2009/0021363 A1 | 1/2009 | Heise et al. | |
| 2009/0069996 A1* | 3/2009 | Ishida et al. | 701/93 |
| 2011/0178675 A1* | 7/2011 | Vassilieff et al. | 701/29 |

* cited by examiner

METHOD FOR THE MEASUREMENT AND ANALYSIS OF TYRE AIR PRESSURE WITH ALLOCATION OF WHEEL POSITIONS AND SYSTEM FOR TYRE AIR PRESSURE MEASUREMENT

CROSS REFERENCE TO RELATED APPLICATIONS

This application is the National Phase Application under 35 USC §371 of International Application No. PCT/EP2010/065187, filed Oct. 11, 2010, which claims priority to German Patent Application 10 2010 000 919.9, filed Jan. 14, 2010, which claims priority to German Patent Application 10 2009 045 712.7, filed Oct. 14, 2009.

BACKGROUND

A. Technical Field

The present invention relates to a method for the measurement and analysis of tyre air pressure with an allocation of wheel positions of a vehicle to be analysed in a system for tyre air pressure measurement, and a corresponding system for tyre air pressure measurement for carrying out the method.

B. Background of the Invention

Modern vehicles have tyre air pressure monitoring systems which determine the current tyre air pressure and warn the driver if a deviation occurs from a predetermined tyre air pressure. Tyre air pressure monitoring systems of this kind contribute considerably to the safety of vehicles.

Systems of generic kind are normally equipped with pressure sensors in the tyres, which transmit the current air pressure to a central analysis unit. In these, each wheel of the vehicle is allocated an air pressure checking device, which transfers the information to the analysis unit together with an individual wheel identifier. A problem with this arrangement, among other things, is that the data transfer must take place in a largely error-free manner. Furthermore, a particular problem consists in the fact that the air pressure checking device may be allocated to a specific wheel position. If this were not the case, the driver might not be informed about a problem at a specific wheel position. If the wheel is changed however and eventually mounted at a different position on the vehicle, then the allocation of the air pressure checking device of the corresponding wheel to a specific wheel position of the vehicle cannot be guaranteed. In order to eliminate this source of error, systems for the allocation of air pressure checking devices to specific wheel positions and wheel detection in them have been described in the prior art.

Thus for example EP 0 806 307 A2 discloses sensors, which simply measure the current rotation rate of the wheel using the energies generated by the wheel rotation, and transmit it to a receiver associated with them. Via a cable between the receiver and a central unit the current rotation rate of the respective wheel is transmitted to a central unit. A disadvantage of this arrangement is that there is a relatively high cost for the cabling of the receivers and a corresponding sensitivity to interference.

From EP 1 807 270 B1 a wheel detection system is known, which uses signals at radio frequencies and a received signal amplitude that varies periodically owing to the rotation of the wheel, to allow the current rotation rate of the wheel to be estimated. A disadvantage of this arrangement is that the radio-frequency is susceptible to interference, since reflections from the surroundings can cause interference and signal dropout effects to occur. This means it is difficult to determine a periodicity from the signals from which the rotation rate is derived.

SUMMARY OF THE INVENTION

The object of the present invention is therefore to provide a method for the measurement and analysis of tyre air pressure which allocates wheel positions of a vehicle for analysis in a system for tyre air pressure measurement, and a system for tyre air pressure measurement for carrying out the method, which is both simple and cost-effective in its construction as well as having a particularly high immunity to interference.

The object is attained with a method and a system for tyre air pressure measurement according to the independent claims.

The method according to the invention is used for tyre air pressure measurement and analysis, with allocation of wheel positions of a vehicle for analysis in a tyre air pressure measurement system. The following are allocated to each wheel of the vehicle: an air pressure checking device, a (low-frequency) LF receiver, in particular a magnetic field strength receiver, an analysis unit and a (radio-frequency) RF transmission device and an individual wheel code. The LF receiver receives electrical LF signals from an LF transmission device of a central unit arranged in the vehicle. The analysis unit of this wheel analyses the received signal amplitudes and from these determines a wheel rotation rate. The transmission device of the wheel then sends RF signals with information about the wheel rotation rate determined and the individual wheel code to the central unit of the vehicle. The central unit then determines the wheel position of the wheel using another measurement system, so that the central unit can allocate the air pressure checking device and its individual wheel code to the known wheel position on the vehicle.

In a particularly advantageous embodiment of the method, the wheel positions are determined by a comparison of the wheel rotation rate of the wheel identified via the wheel code, transmitted to the central unit, with the wheel rotation rates of known positions from another measurement device, in particular an anti-lock braking system (ABS system). If there is close agreement between the wheel rotation rates transmitted and one of the wheel rotation rates from the other measurement device, the central unit allocates the corresponding air pressure checking device and its individual wheel code to the known wheel position on the vehicle.

Alternatively the allocation can also take place by a comparison of the transmitted wheel rotation rates of all four wheels against each other. In order to do this, the type of bend is first determined using the measurement device, in particular whether it is a right-hand or a left-hand bend. The measurement device can be, in particular, a steering angle sensor, a gyroscope or the indicator light. Since when travelling round a bend all four wheels have different radii of curvature, from a comparison of the transmitted wheel rotation rates against each other the central unit can conclude, based on the type of bend, at which position of the vehicle each wheel is located.

The term "low-frequency" is to be understood as a long wave in the lower wavelength range with corresponding frequencies between approximately 20 and 150 kilohertz. "Radio frequency" by contrast refers to frequencies greater than 100 Megahertz. Owing to the long wavelength of the low-frequency signals, practically no interference occurs, which means that detecting the periodicity of the wheel rotation is simpler and less error-prone. The transmission of the signals from the air pressure checking device of the wheel to the central unit of the vehicle on the other hand is carried out with radio-frequency signals, which allow better data transmission.

The advantage of the method according to the invention lies in the fact that no cabling is required from the central unit of the vehicle to the region of the wheels in order to bring the signals transmitted or to be transmitted into proximity with the wheel.

In an advantageous embodiment of the method, in order to carry out either the positioning detection of the wheel or to receive the transmission of the air pressure measured in the wheel, the air pressure checking device is started by means of the LF signals from the central unit. The air pressure checking device comprises, among other things, pressure sensors which measure the current air pressure in the wheel and transmit it to the analysis unit of the air pressure checking device, or to the RF transmitter respectively. From there the current air pressure together with the wheel code is transmitted to the central unit of the vehicle using RF signals.

In an advantageous embodiment of the invention the LF signals are also used to synchronise the air pressure checking device.

If the rotation rate of the wheel is determined from the periodically varying signal amplitude of the detected LF signal, then the wheel can be individually allocated to a specific position of the vehicle. In particular while the vehicle is in motion each wheel has deviations of the rotation rate in comparison to the rotation rates of the other wheels. This is a consequence of the fact that a vehicle hardly ever travels in a straight line, but is more or less always driving in bends due to the small steering movements of the driver. The individual rotation rate of the wheel is determined by means of the periodically varying signal amplitude of the detected LF signal. The received signal amplitude varies periodically due to the rotation of the wheel. Due to the fact that the signal receiver is fixed in one position of the wheel and rotates about the wheel axis, the result is a constantly varying position of the receiver in relation to the LF transmitter. Due to this, a variation in the received signal amplitude occurs, which allows estimates of the rotation rate of the wheel to be made.

As soon as a specific wheel position is allocated to a specific air pressure checking device with its wheel code, all further signals that are sent from this air pressure checking device to the central unit of the vehicle and have this wheel code are allocated to the correspondingly defined wheel position on the vehicle. This means that carrying out a wheel identification and allocation to the wheel position is not required for every transmission of the signal.

It is particularly advantageous if the allocation of the wheel position takes place while the vehicle is travelling around a bend. In particular when travelling around a bend, markedly different wheel rotation rates can be recorded on the vehicle. Due to this, the identification of the individual wheel rotation rates with the corresponding wheel positions is particularly easy to achieve.

In order to ensure that the wheel code continues to be in agreement with the wheel position it is advantageous if a repeated allocation of the wheel position to the wheel code is performed after predetermined events. Examples of such events can be the activation of the engine ignition, a specific time since the last allocation, a tyre change detected by the system, completion of a certain vehicle mileage or other similar events.

A tyre air pressure measurement system according to the invention for carrying out the method comprises a central unit arranged in the vehicle with a (low-frequency) LF transmission device, a (radio-frequency) RF receiver device and a central analysis device. Arranged on each wheel of the vehicle are an air pressure checking device, a (low-frequency) LF receiver device, a (radio-frequency) RF transmission device and an analysis unit for determining a rotation rate using a periodically varying amplitude of the received (low-frequency) LF signal from the LF transmission device. The tyre pressure measurement system further comprises a measurement device for measuring the wheel rotation rate on each wheel and/or for determining the type of bend.

To compare the wheel rotation rate determined by the frequency of the LF transmission and receiving devices with the wheel rotation rate of a known wheel position of the vehicle, in a particularly preferred embodiment the measurement device is provided in a stationary position on each wheel position for determining a wheel rotation rate there. The central unit communicates both with the RF transmission device on the wheel and also with the stationary measurement device, arranged at a known wheel position. From the data thereby obtained a comparison and thus an allocation of the signals from the wheel to a specific wheel position is facilitated. After this allocation an initialisation and/or synchronisation of the air pressure checking device takes place via the low-frequency transmission and receiver devices, and the transfer of the air pressure in the wheel determined by the air pressure checking device via the radio-frequency transmission and receiver devices.

Preferably, the low-frequency receiver device is a magnetic field strength receiver. The rotation rate of the wheel effects a change in the magnetic field strength of the low-frequency signal, from which a periodicity can be measured, which allows estimates of the actual rotation rate to be made.

Preferably, the low-frequency receiver device, the radio-frequency transmission device and the analysis unit form a component of the air pressure checking device. As a combined component the air pressure checking device can be fixed to the wheel.

BRIEF DESCRIPTION OF THE DRAWINGS

Other advantages of the invention are described in the following exemplary embodiments. They show.

DETAILED DESCRIPTION OF THE PREFERRED EMBODIMENTS

Figure 1:
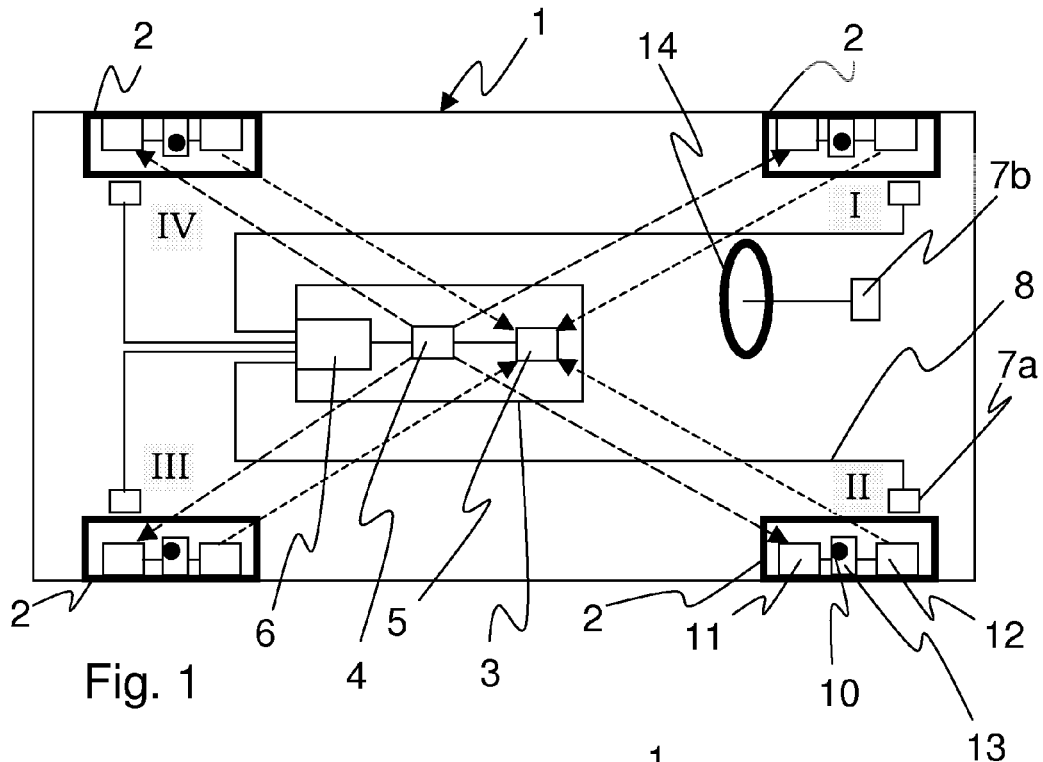
FIG. 1 a schematic illustration of a vehicle.

FIG. 1 shows a schematic illustration of a vehicle 1 with four wheels 2. In the vehicle 1 a central unit 3 is arranged, which contains a low-frequency LF transmitter 4 and a radio-frequency RF receiver 5. In addition the central unit 3 comprises a central analysis device 6. The central analysis device 6 has measurement devices 7a connected to it, here with a cable 8, which are arranged on each wheel 2 in a stationary position. The measurement device 7a determines the rotation rate of the respective wheel 2 allocated to it. It can be a component of a further monitoring system, such as an anti-lock braking system ABS or an electronic stability program ESP, for example.

An air pressure checking device 10 is located on each wheel 2. The air pressure checking device 10 consists of a pressure sensor, for example, which measures the internal pressure of the wheel. In addition, on each wheel 2 a low-frequency LF receiver 11 and a radio-frequency RF transmitter 12 are provided. Air pressure checking device 10, LF receiver 11 and RF transmitter 12 are connected to an analysis unit 13. In the analysis unit 13 the signal from the LF transmitter 4 received by the LF receiver 11 is analysed in particular. As soon as the wheel 2 rotates, the received amplitude of the LF signal changes, which results in a periodically varying signal amplitude. By means of this periodicity an estimate can be made of the rotation rate of the respective wheel. This is effected either by counting the minimum signal levels received or the maximal signal levels received. Alternatively the average signal level can also be determined and compared with the value for how often the actual signal level corresponds to the average signal level. The respective correspondences also lead to a measurement of the actual rotation rate of the wheel 2. Another possibility is that a Fast Fourier Transform of the received signal level is carried out and the current rotation rate of the wheel is estimated from this.

The rotation rate of the wheel 2 determined by the analysis unit 13 is transmitted via the RF transmitter 12 to the RF receiver 5 of the central unit 3 by radio frequency in the range above 100 Megahertz.

The long-wave transmission of the signals from the LF transmitter 4 of the central unit 3 to the LF receiver 11 on the wheel 2 takes place at a frequency in a range between approximately 20 to 150 Kilohertz. It is not this exact frequency range given for the low-frequency and the radio-frequency that is important here. What is more important in fact is that the signal for determining the rotation rate has a longer wavelength and is therefore less susceptible to errors from reflections and interference than the transmission of the rotation rate information, and later of the signals related to the pressure in the respective wheel 2, to the central unit 3. For an exact transmission of data the shorter wavelength radio-frequency is used in comparison to the longer wavelength low-frequency.

In order to allocate the respective wheel 2 to a specific position of the vehicle, an analysis of the rotation rate of the wheel 2 transmitted by the respective wheel 2 via the RF transmitter 12 is carried out in the central unit 3. This is carried out by the central analysis device 6, which receives data relating to the rotation rate of a wheel 2 at a respective position from the measurement device 7a, stationarily arranged on each wheel 2, via a cable 8. The central analysis device 6 compares the signals received by the RF receiver 5 relating to the rotation rate of the respective wheels 2 and compares them with the rotation rates of the wheels 2 at specific positions that are transmitted by the measurement devices 7a. As soon as a substantial correspondence with the transmitted wheel rotation rates can be established, the ID-wheel code additionally transmitted by the RF transmitter 12 of the respective wheel 2 is assigned to the specific position of the wheel on the vehicle. The system therefore detects, in successive signal transmissions of the respective RF transmitter 12 with the aid of the additionally transmitted ID code, which wheel position the received signals relate to.

Alternatively the allocation of the wheel position can also take place by means of a comparison of the transmitted wheel rotation rates of all four wheels 2 with each other. To this end, by means of a measurement device 7b, which as is clearly seen in FIG. 1 is connected to the steering wheel 14, the type of bend is first determined. In this regard it is essentially necessary to distinguish between a left-hand and a right-hand bend. The measurement device 7b can be, in particular, a steering angle sensor, a gyroscope or the indicator light. Since when travelling round a bend all four wheels 2 traverse different, but characteristic bend radii, by comparing the transmitted wheel rotation rates with each other according to the type of bend, the central unit 3 can determine at which position of the vehicle 1 each wheel 2 is locate.

So that the analysis unit 13 of the respective wheels 2 detects that it is to carry out a rotation rate measurement, a corresponding signal, where appropriate together with a signal for a synchronisation of the system, is likewise determined using the low-frequency of the LF transmitter 4 and the LF receiver 11. On an appropriate LF signal from the central unit 3 the analysis unit 13 is therefore activated to the effect that it is required to carry out a rotation rate measurement.

Preferably, the LF receiver 11 on the respective wheel 2 is a magnetic field strength receiver. For the low-frequency signals used in particular, it is sufficient for only the magnetic field strength of the field to be evaluated. A slowly changing magnetic field therefore results, which is largely insensitive to interference sources. The detection of the periodicity of the wheel rotation is therefore relatively simple.

The LF receiver 11, the RF-transmitter 12 and the analysis unit 13 can form a single module together with the air pressure checking device 10. They can thus be attached to the wheel 2 very simply and in a protected position. The LF transmitter 4 and the RF receiver 5 can also be an integral component of the central unit 3. Of course it is also possible for these to be arranged outside the central unit 3. The important point however is that a dedicated transmitter 4 or receiver 5 is not provided for each wheel, but the LF transmitter 4 and RF receiver 5 are provided centrally for all wheels 2 of the vehicle 1.

Figure 2:
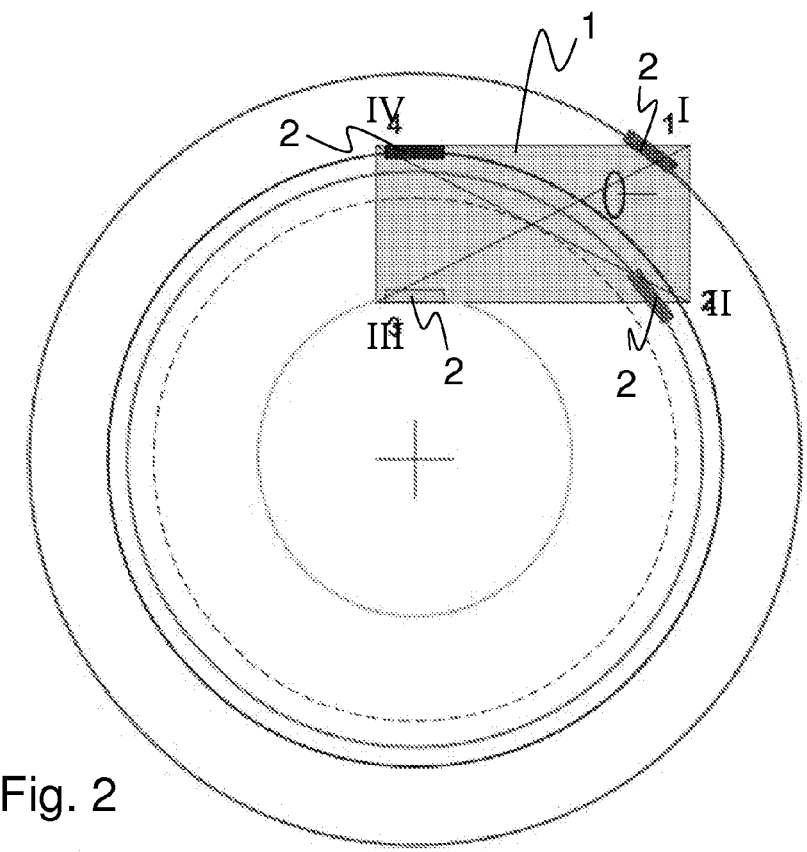
FIG. 2 a schematic illustration of a bend traversal by the vehicle.

In FIG. 2 a top view of the vehicle 1 when the vehicle is travelling round a bend. The respective concentric circles indicate the trajectories of the individual wheels 2 at the respective positions of the vehicle 1. It is clear from this that the wheel at position I travels along the largest curve radius, while the wheel at position III has to traverse the smallest bend radius. The result of this is that the wheel 2 at position I must have the highest rotation rate, while the wheel 2 at position III has the lowest rotation rate. The wheels 2 at the positions II and IV also differ with respect to their rotation rate and their bend radius, even if this is not as clear as for the wheels 2 at positions I and III. It is clear from this illustration that to detect the rotation rate of the wheels 2 at the respective positions, a curved trajectory of the vehicle is particularly advantageous, since this is the case in which differences in the rotation rate of the individual wheels 2 of the vehicle 1 appear most clearly.

Figure 3:
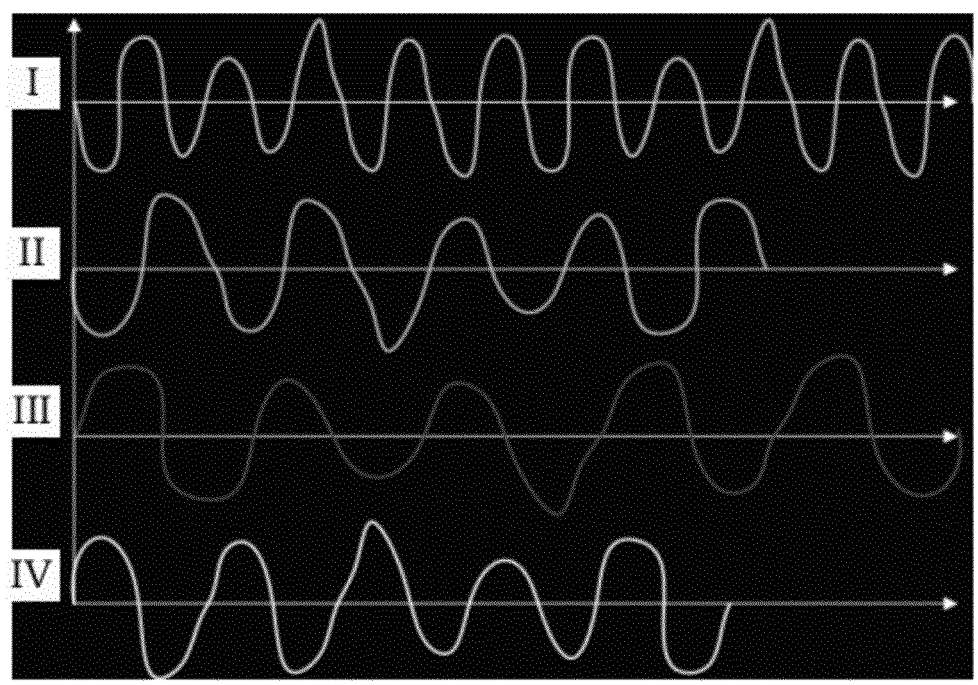
FIG. 3 a periodically varying signal amplitude on different wheels.

In FIG. 3 the change in the signal amplitude on the respective wheel at the positions I to IV of the vehicle 1 from FIG. 2 is shown. It is clear from this that at position I the change in the signal amplitude has the highest frequency. From this we conclude that it is here also that the highest wheel rotation rate occurs. The rotation rate is thus obtained for example by counting the respective amplitudes or using other, already previously described methods. The lowest frequency of the change in the signal amplitude is found at position III. The lowest wheel rotation rate therefore occurs here. This wheel rotation rate is followed by the rotation rate at position II and thereafter by position IV. By calculating the respective wheel rotation rate and transmitting this rotation rate together with the ID-code of the respective wheel 2, by a comparison with the values of the measurement device 7, the position of which on the vehicle 1 is known and invariant, the allocation of the ID-code of the wheel 2 to the specific position I to IV on the vehicle 1 is carried out in the central unit 3. Further signals, which together with the ID-code of the wheel 2 are sent to the central unit 3, can therefore be allocated exactly to a specific position I to IV on the vehicle 1.

The calculation of the rotation rate at the respective position I to IV can take place with each signal transmission with respect to the current air pressure in the wheel 2. It is usually sufficient however to transmit the rotation rate and therefore wheel position, only at specific special events. Such events can be, for example, when the ignition of the vehicle is switched on or also manual input, in the form of an indication that a tyre change has taken place. Of course, other events can also be selected in order to carry out a calculation of rotation rate and therefore position.

The invention is not limited to the exemplary embodiments illustrated. Modifications to the invention within the scope of the claims are possible at any time.

REFERENCE LIST 1 vehicle
2 wheel
3 central unit
4 LF transmitter
5 RF receiver
6 central analysis device
7 measurement device
8 cable
10 air pressure checking device
11 LF receiver
12 RF transmitter
13 analysis unit
14 steering wheel
I, II, III, IV wheel positions

What is claimed is:

1. A method of measuring and analyzing tire air pressure according to a wheel position of a vehicle, comprising the steps of:
    coupling each of a plurality of wheels of the vehicle to an air pressure checking device, an LF receiver, an analysis unit, and an RF-transmission device;
    allocating an individual wheel code to each of the plurality of wheels;
    providing an LF signal to the LF receiver by an LF transmission device of a central unit;
    analyzing the amplitude of the LF signal to determine a wheel rotation rate for each of the plurality of wheels;
    sending an RF signal to the central unit, the RF signal being coupled with information about the wheel rotation rate and the individual wheel code;
    determining the wheel position for each of the plurality of wheels using a measurement device according to the wheel rotation rate; and
    enabling the air pressure checking device according to the individual wheel code to sense the tire air pressure associated with the wheel position.

2. The method according to claim 1, wherein in the step of determining the wheel position, the central unit compares the transmitted wheel rotation rate with a plurality of known wheel rotation rates that are associated with a plurality of known wheel positions according to the measurement device, and if the wheel rotation rate is matched to one of the plurality of known wheel rotation rates, the central unit associates the individual wheel code to a known wheel position of the plurality of known wheel positions in the measurement device.

3. The method according to claim 1, wherein the step of determining the wheel position, the central unit compares the wheel rotation rate of each of the plurality of wheels with each other, and depending on a type of bend selected between a right-hand and left-hand bend, the central unit associates the individual wheel code a known wheel position the type of bend being determined by means of the measurement device that is selected from a group consisting of a steering angle sensor, a gyroscope and a indicator control.

4. The method according to claim 1, wherein the air pressure checking device and the determination of the position are associated with the LF signals from the central unit.

5. The method claim 1, wherein the air pressure checking device is synchronized by means of the LF signals from the central unit.

6. The method according to claim 1, wherein the wheel rotation rate of each of the plurality of wheel is determined from a periodically varying signal amplitude of the LF signal.

7. The method according to claim 1, wherein the wheel position is assigned to all subsequent signals from the air pressure checking device associated with the individual wheel code in the central unit.

8. The method according to claim 1, wherein the wheel position is determined while the vehicle is travelling round a bend.

9. The method according to claim 1, wherein recurring association of the wheel position to the individual wheel code takes place after predetermined events that include switching on the engine ignition, time since the last assignment, tire changes, and vehicle mileage attained.

10. A tire air pressure measurement system in a vehicle, comprising:
    a central unit that further comprises an LF transmission device, an RF receiver device and a central analysis device;
    a plurality of wheels, each wheel of the plurality of wheels being coupled with an air pressure checking device, an LF receiver device, an RF transmission device and an analysis unit for determining a wheel rotation rate using a periodically varying amplitude of an LF signal that is provided by the LF transmission device in the central unit; and
    a measurement device for measuring the wheel rotation rate on each wheel and determining a type of bend.

11. The tire air pressure measurement system according to claim 10, wherein the measurement device is arranged in a stationary position at a wheel position.

12. The tire air pressure measurement system according to claim 10, wherein the LF receiver device is a magnetic field strength receiver.

13. The tire air pressure measurement system according to claim 10, wherein the LF receiver device, the RF transmission device, the analysis unit and the air pressure checking device are integrated in a first module, and the LF transmission device, the RF receiver device and the central analysis device are integrated in a second module.

* * * * *